H. F. UNRUH.
LEVELING ATTACHMENT.
APPLICATION FILED JUNE 24, 1919.
1,349,928. Patented Aug. 17, 1920.
2 SHEETS—SHEET 1.
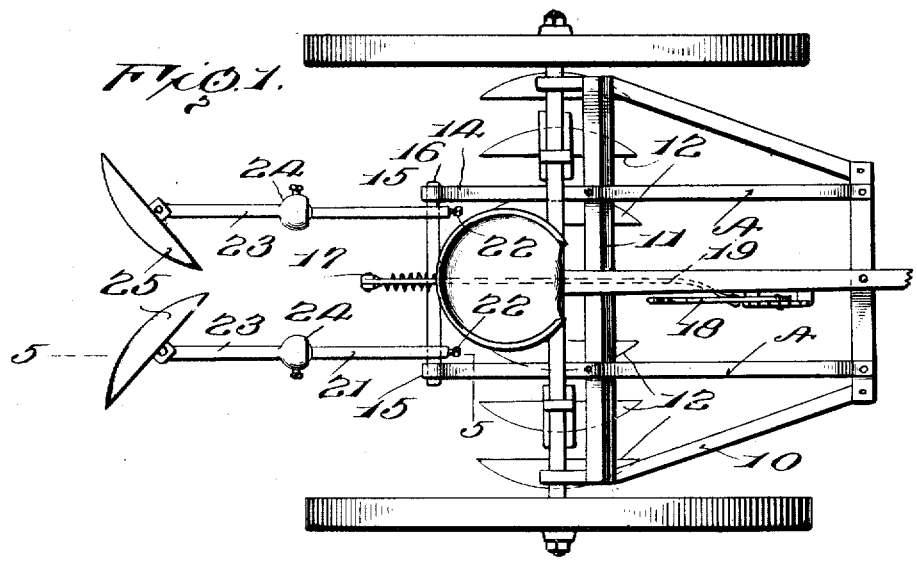
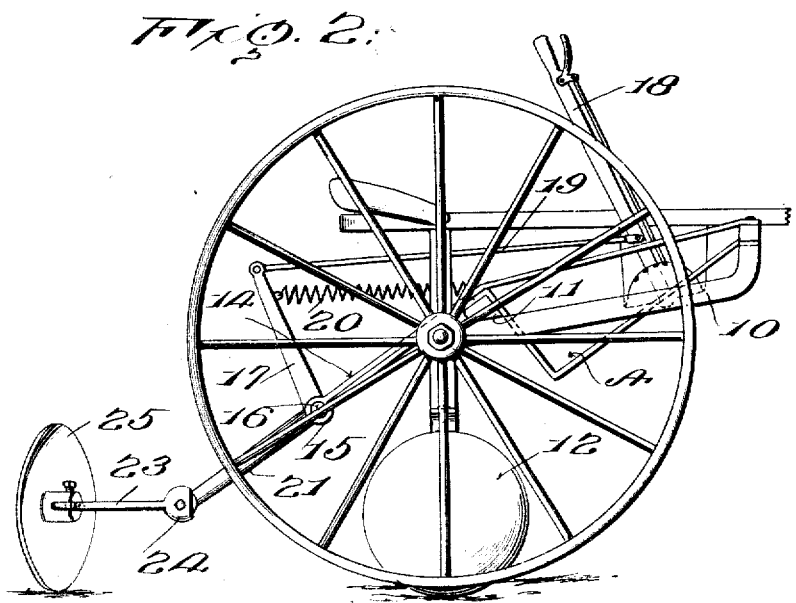
INVENTOR:
Herbert F. Unruh.
BY
Chandler & Chandler
ATTORNEYS.

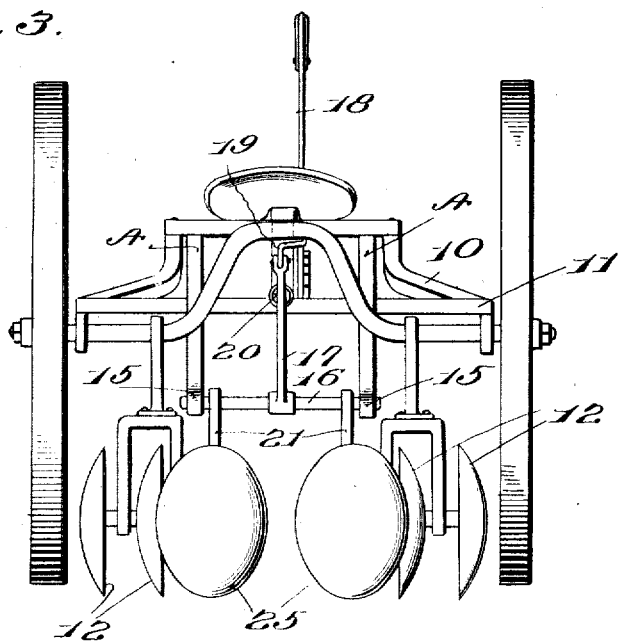
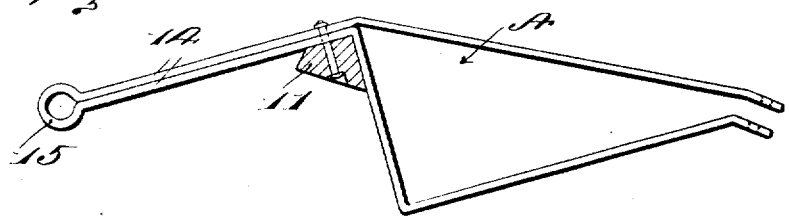
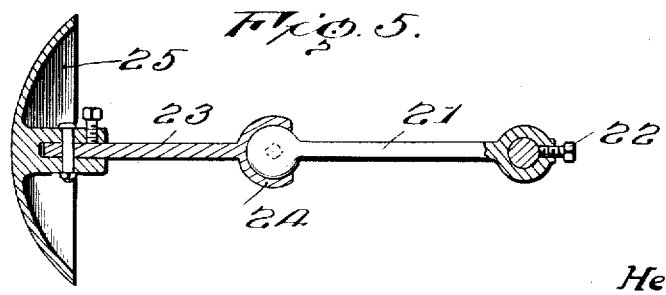

UNITED STATES PATENT OFFICE.

HERBERT F. UNRUH, OF MENO, OKLAHOMA.

LEVELING ATTACHMENT.

1,349,928.     Specification of Letters Patent.     Patented Aug. 17, 1920.

Application filed June 24, 1919. Serial No. 306,310.

*To all whom it may concern:*

Be it known that I, HERBERT F. UNRUH, a citizen of the United States, residing at Meno, in the county of Major, State of Oklahoma, have invented certain new and useful Improvements in Leveling Attachments; and I do hereby declare the following to be a full, clear, and exact description of the invention, such as will enable others skilled in the art to which it appertains to make and use the same.

This invention relates to new and useful improvements in agricultural machines and particularly to attachments therefor.

The principal object of the present invention is to provide a novel and improved attachment for a cultivator which will break up the ridges and level the same.

Another object is to provide a novel and improved device of this character which is capable of being applied to any cultivator now in use.

A further object is to provide a novel and improved attachment of this character which can be readily and easily adjusted to different angles, and which can be raised and lowered as desired.

Other objects and advantages will be apparent from the following description when taken in connection with the accompanying drawing.

In the drawing:

Figure 1 is a top plan view of a cultivator showing the attachment thereon.

Fig. 2 is a side elevation of the same.

Fig. 3 is a rear elevation of the same.

Fig. 4 is an enlarged detail view of the bracket A removed from the machine.

Fig. 5 is an enlarged vertical longitudinal sectional view taken on the line 5—5 of Fig. 1.

Referring particularly to the accompanying drawings, 10 represents the frame of a cultivator to which are secured a transverse beam 11 carrying the cultivator disks 12. A bracket is secured on each side of the frame of the cultivator and extends rearwardly therefrom. Each of these brackets is formed from a single length of metal of suitable width and thickness for the purpose, and includes an open triangular body A which is bolted to the frame of the cultivator and may inclose cross bars therein if any exist, the rearwardly extending portions or arms 14, and the circular portion 15 which connects the rear ends of the arms 14, and receives therein one end portion of a transverse shaft 16. This shaft is arranged to rock in the said circular portions, said portions acting as bearings, and secured to the central portion of the shaft and rising therefrom, is an arm 17 which is connected to an operating lever 18 mounted on the frame of the machine. A coil spring 20 is connected at one end to the frame of the cultivator and at its other end to the said arms 17 for assisting in swinging the lever to rock the shaft. Secured to the shaft at opposite sides of the arm 17, and extending rearwardly therefrom, are trailing arms 21 adjustable longitudinally on the said shaft by set screws 22. The rear ends of the arms 21 are connected to other arms 23 by means of ball and socket joints 24 and set screws whereby each second arm is capable of being adjusted to different angles with respect to the first arm and to the ground. Carried by the rear ends of the arms 23 are ground treating disks 25, the same being adjustable to different angles on said arms for action on the soil to different angles and depths.

This attachment serves as an efficient means for breaking up and leveling the soil of the ridges in which were planted the crops of the previous year. Ordinarily, when plowing, these ridges, though broken by the disks of the plow, remain in ridges, or humps, higher than the remaining portions of the soil. The rear disks 25 effectively break up the ridges and spread the soil therefrom evenly and properly so that when the field is plowed it will have a level appearance.

The device is of such nature that it may readily be attached to any cultivator without modifications to the cultivator or plow.

What is claimed is:

A ridge leveling attachment for an agricultural machine, the same comprising a pair of brackets whereof each includes an open triangular body for attachment to the frame of such machine, arms projecting rearwardly from the body, and bearings carried by said arms, a rock shaft journaled in said bearings, an arm rising therefrom, a lever connected by a link with said arms for adjusting the position of the shaft, trailing arms adjustably mounted on said rock shaft, other arms carrying ridge-breaking and leveling implements, and ball-and-socket joints between these arms and the trailing arms whereby their angles thereto may be adjusted.

In testimony whereof, I affix my signature, in the presence of two witnesses.

HERBERT F. UNRUH.

Witnesses:
 ALBERT H. RATZLAFF,
 P. S. KANE.